United States Patent
Elphinstone et al.

(10) Patent No.: US 6,748,452 B1
(45) Date of Patent: Jun. 8, 2004

(54) FLEXIBLE INTERPROCESS COMMUNICATION VIA REDIRECTION

(75) Inventors: Kevin John Elphinstone, Ossining, NY (US); Trent Ray Jaeger, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,869

(22) Filed: Mar. 26, 1999

(51) Int. Cl.$^7$ .................................. G06F 15/163
(52) U.S. Cl. ........................ 709/310; 709/313
(58) Field of Search ................... 709/311, 310, 709/318, 320, 329, 330, 331, 313, 315, 316, 101, 108

(56) References Cited

U.S. PATENT DOCUMENTS

| 4,831,518 A | * | 5/1989 | Yu et al. ..................... 364/200 |
| 6,247,054 B1 | * | 6/2001 | Malkin ....................... 709/225 |
| 6,252,589 B1 | * | 6/2001 | Rettig et al. ................ 345/333 |

OTHER PUBLICATIONS

Mach 3 Kernel Principles, Copyright, 1991 Open Software Foundation and Carnegie Mellon University, Keith Loepere, NORMA–MK12: Jul. 15, 1992, pp. 1–64.
Operating System Protection for Fine–Grained Programs, Trent Jaeger, et al., IBM T.J. Watson Research Center, pp. 1–15.
Providing Policy Control Over Object Operations in a Mach Based System, Spencer E. Minear, Secure Computing Corporation, Apr. 28, 1995, pp. 1–15.
Clans & Chiefs, Jochen Liedtke, German National Research Center for Computer Science, pp. 1–13.
Building Efficienct Operating Systems from User–Level Components in Pebble, Eran Gabber, et al., Lucent Technologies—Bell Laboratories, pp. 1–14.
Domain and Type Enforcement in a μ–Kernel, Jonathan Tidswell and John Potter, Microsoft Research Institute, pp. 1–7.

* cited by examiner

Primary Examiner—John Follansbee
Assistant Examiner—The Thanh Ho
(74) Attorney, Agent, or Firm—Douglas W. Cameron; Anne V. Dougherty

(57) ABSTRACT

A mechanism for inter-process communication (IPC) redirection is defined that enables flexible and dynamic management of IPC paths. In some cases, it is desirable to interpose a process on a communication channel. There are a number of uses of such interposition, ranging from auditing communication to capturing requests for a debugger to authorizing operations expressed in the communication. Prior IPC mechanisms typically do not enable dynamic and flexible interposition. Either interposition is ingrained in the process identity or is done in an ad hoc manner (e.g., by inserting code into the kernel). An IPC mechanism is defined that enables a communication from a source to a destination to be arbitrarily redirected. Services, called redirection controllers, are defined that are able to specify the redirections for IPC paths. Redirections may be set up dynamically because the redirection data is not dependent on permanent information like the process identifier, but rather, they are left to the discretion of the redirection controllers.

34 Claims, 12 Drawing Sheets

FLEXIBLE INTERPROCESS COMMUNICATION VIA REDIRECTION

FIELD OF INVENTION

The present invention is related to Interprocess Communications. In particular, the present invention is related to a mechanism that enables a redirection controller to specify the destination of any interprocess communication (IPC). Even more particularly, the present invention is related to a mechanism that enables a redirection controller to specify the destination of any interprocess communication (IPC) such that an IPC either: (1) is sent to the requested destination; (2) is redirected to an alternative destination; (3) is blocked from being sent; or (4) incurs a redirection fault which is handled by the redirection controller.

| Glossary | |
|---|---|
| Interprocess Communication | Transfer of a message from a source identifier (for one or more sender processes), to a destination identifier (for one or more receiver processes). |
| IPC process | Implementor of the interprocess communication mechanism. |
| Redirection | The transfer of an interprocess communication to a destination other than that specified by the source. |
| Redirection Data | A mapping between the interprocess communication paths (i.e., pairs of sources and destinations) and the entries that specify the actual destinations for the IPC process to use for those paths |
| Redirection Controller | A process assigned to manage the redirection data entries for a set of interprocess communication paths |
| Redirection Fault | The result when a requested interprocess communication path contains no destination entry in the redirection data. |

BACKGROUND

The conflict between Interprocess Communication ("IPC") performance and security-policy enforcement is fundamental to the development of micro-kernel systems. In such systems, many system services may be implemented at user-level, so many processes may need to communicate to complete a task. In early micro-kernel systems, such as Mach, the kernel only authorizes whether a process can send or receive an IPC from another process (see K. Loepere, *Mach 3 Kernel Principles*, Open Software Foundation and Carnegie Mellon University, 1992). Actual authorization of the operations on server objects is performed by the servers themselves. While the server must be trusted to control access to its own objects, it may not be designed to either interpret or enforce the system's global security policy. In these cases, an additional trusted process, often called a reference monitor, is assigned the task of enforcing the system's access control policy properly.

Security researchers have extended such systems to enable the enforcement of security policy, such as the Distributed Trusted operating System (DTOS) (see S. Minear, *Providing Policy Control Over Object Operations in a Mach-based System*, in Proceedings of the Fifth USENIX Security Symposium, 1995), but Mach's IPC mechanism limits flexibility which, in turn, limits the potential optimizations. Mach ports enable a principal with receive rights to that port to receive IPCs from those principals with send rights to the port. In order to interpose a task to intercept IPCs, the current receiver must delegate its port receive right to another principal. This means that interposition requires the cooperation of the receiver which is a problem if either: (1) the receiver is incapable of the cooperation; or (2) the receiver resists the interposition. Thus, the DTOS implementation which uses Mach's IPC mechanism depends on the server processes (or the kernel for kernel resources, such as ports) to call security servers to authorize operations using the system security policy (a round-trip IPC). Since the servers cannot tell when security policy has changed, they must continue to request authorizations using this mechanism. Even though the designers of DTOS smartly cache capabilities in the kernel to improve performance (to a single system call, about one IPC), in general, these IPCs would not be necessary if the IPCs could be redirected to reference monitors on demand (e.g., only when the security policy changes).

In more recent micro-kernel systems, Liedtke pushed authorization completely out of the kernel to optimize IPC performance (see J. Liedtke et al, *Achieved IPC Performance*, in Proceedings of HotOS VI, 1997). In the L4 system, the kernel does not authorize communication, but provides unforgeable IPC source identification and permits any IPC to be redirected to another process instead. L4 uses a model called "Clans & Chiefs" to define these redirections (see J. Liedtke, *Clans & Chiefs*, in Achitektur von Rechensystemen, 1992, in English). In this model, a chief is a special process in a clan (i.e., set of processes). Assignments of clan members to chiefs is static in L4. Any IPC between two processes in the same clan is forwarded directly to the destination by the kernel. However, any IPC either to a process outside the clan or from a process outside the clan is automatically redirected by the kernel to the clan's chief. To monitor individual processes, we found it necessary to assign each to their own clan, so three IPCs (client-chief, chief-chief, chief-server) are required for an inter-process request. While we showed that the base cost could be as low as 4 microseconds and that we measured 9 microseconds (see T. Jaeger, *Operating System Protection for Fine-grained Programs*, in Proceedings of the Seventh USENIX Security Symposium, 1998), in many cases, the chief-chief IPC is unnecessary (see J. Tidswell and J. Potter, *Domain and Type Enforcement in a Micro-kernel*, in Proceedings of the 20th Australasian Computer Science Conference, 1997).

Another concept that is being developed is called a portal (see E. Gabber et al, *Building Efficient Operating Systems from User-level Components in Pebble*, in Proceedings of the 1999 USENIX Annual Technical Conference, 1999). A portal is a reference to a customizable IPC mechanism. Portals are defined by a privileged task and invoked by the kernel on an IPC request. The proposed implementation of portals uses a portal table in the nucleus to vector references to the portal code which the nucleus then executes (i.e., all portal code is trusted). Portals enable trusted customizations to be defined outside the nucleus and run inside the nucleus. However, since these customizations must be trusted we must trust the compiler which increases our system TCB, and untrusted processes cannot set redirection entries (even for other untrusted processes). This limits the flexibility of the IPC redirection. The present invention addresses this need.

SUMMARY

In accordance with the aforementioned needs, the present invention is a method, system and computer program product that defines an interprocess communication (IPC) mechanism enabling redirection controllers to redirect communications to selected destinations.

A method for performing interprocess communication (IPC) redirection, having features of the present invention comprises the steps of: receiving an IPC from an IPC process, the IPC including a source identifier and a destination identifier; and modifying a redirection entry specifying an actual destination for the IPC associated with the source identifier and the destination identifier; wherein the IPC process can restrict a set of redirection entries that can be modified.

In a preferred embodiment, the IPC redirection mechanism uses the source and destination identifiers of the communication and the system's redirection data to find the current redirection entry for that communication. If the redirection entry is null, a redirection fault is taken. The IPC redirection mechanism determines the redirection controller assigned for this source and destination and requests that the redirection controller handle the fault. The redirection controller may then specify a redirection entry for this combination of source and destination as well as others. The redirection entry values may range from: 'blocked,' which rejects the IPC request; to the specified destination; to an alternative destination.

Therefore, trusted user-level processes may specify the redirections for processes to which they are assigned. Also, the redirections may be set arbitrarily, i.e., to any process, and dynamically, i.e., at any time.

DETAILED DESCRIPTION

Figure 1:
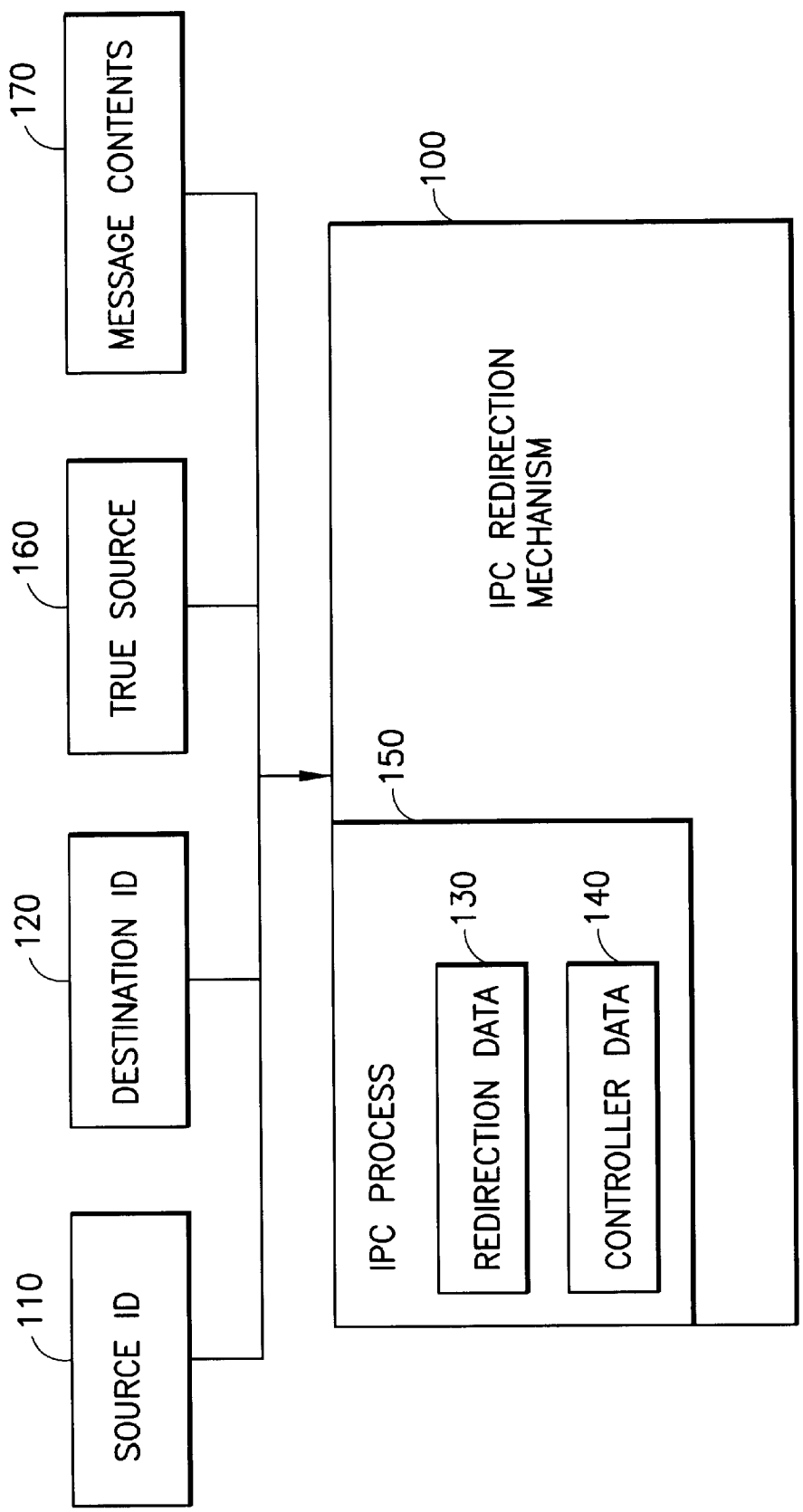
FIG. 1 illustrates an example of how a interprocess (IPC) redirection mechanism pursuant to the present invention takes a source identifier (source id), destination identifier (destination id), and true source and uses the redirection data and controller data of the IPC process to send interprocess communications.

FIG. 1 depicts an example of an interprocess (IPC) redirection mechanism having features of the present invention. As depicted, the IPC (100) takes a source identifier (110), a destination identifier (120), and a true source (160) and uses the redirection data (130) and controller data (140) to determine where to send the message contents (170). The source and destination identifiers may refer to individual processes, groups of processes, or message queues (i.e., ports) among other possibilities.

In a preferred embodiment, the source and destination identifiers refer to individual processes. The true source (160) identifies the originator of the message. In a preferred embodiment, a source identifier for a true source may only be claimed if an IPC may be redirected to current source identifier from the true source's source identifier (directly or indirectly).

A preferred embodiment of the present invention includes features implemented as software tangibly embodied on a computer program product or program storage device for execution on a client or server (not shown). For example, software implemented in a popular object-oriented computer executable code such as Sun MicroSystems' JAVA™ provides portability across different platforms. Those skilled in the art will appreciate that other procedure-oriented and object-oriented (OO) programming environments, such as C++ and Smalltalk can also be employed.

Those skilled in the art will also appreciate that methods of the present invention may be implemented as software for execution on a computer or other processor-based device, such as a hand-held device, set-top box or an Internet appliance. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the client, server, or other processor-based device could be accessed and maintained directly via disk (not shown), the network, another device, or could be distributed across a plurality of devices.

FIG. 1 also shows that the IPC process (150) implements the IPC redirection mechanism. In a preferred embodiment, the IPC process comprises an operating system kernel.

Figure 2:
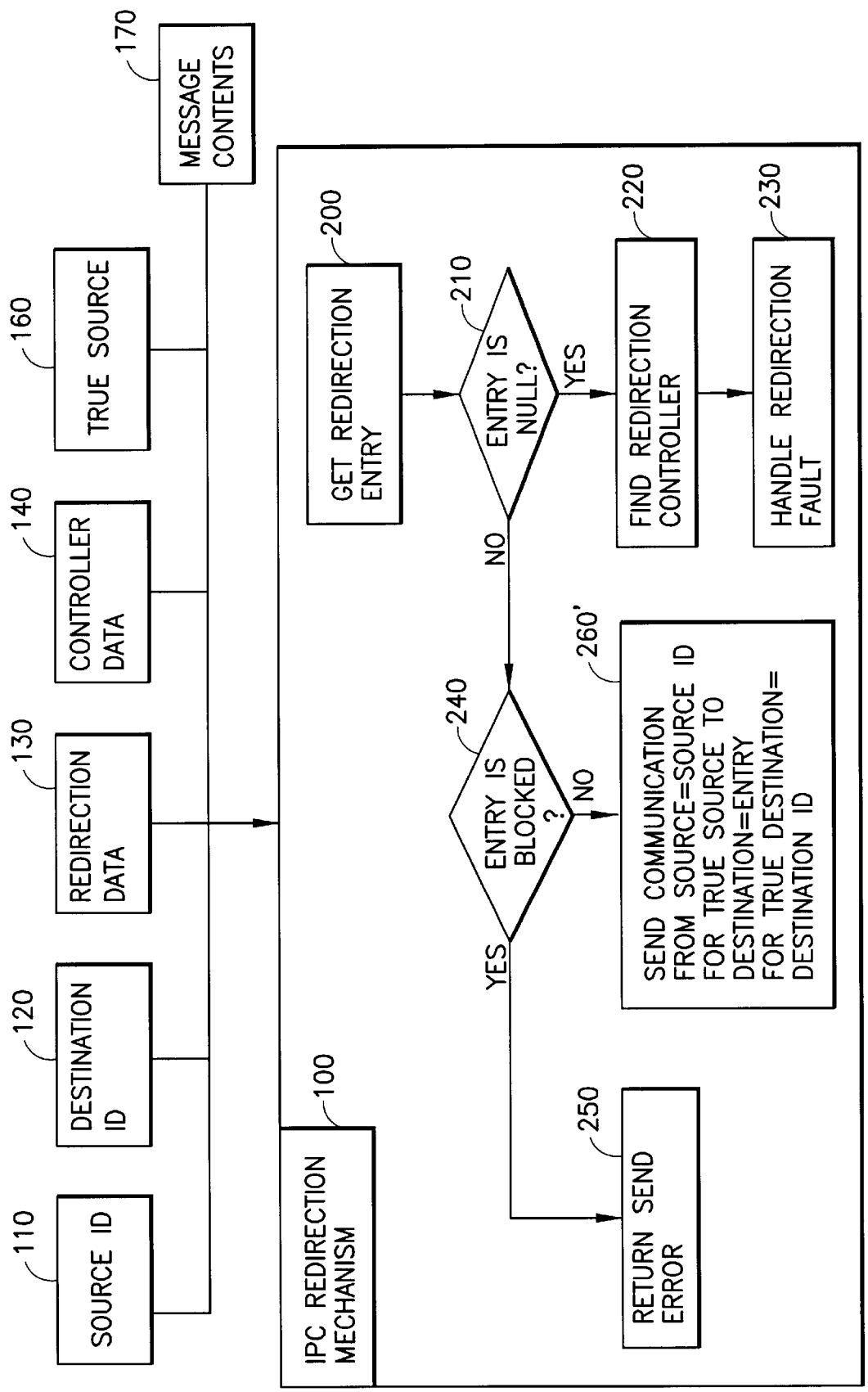
FIG. 2 illustrates an example of IPC redirection logic in accordance with the present invention.

FIG. 2 depicts an example of logic for the IPC redirection mechanism (100). As depicted, a redirection data entry (400) for the IPC is retrieved, in step 200. In step 210, if the entry's value is 'null', then a redirection fault is said to occur. The redirection fault is handled by retrieving the redirection controller (510) for the IPC, in step 220 and having the redirection controller handle the redirection fault, in step 230. If in step 210, the entry's value is not 'null' and, in step 240 the entry's value is not 'blcked', then in step 260' the IPC is sent to the redirection entry (FIG. 3, 310) specified. If the entry's value is 'blcked' in step 240, then in step 250, a send error is returned to the source identifier (110).

Figure 3:
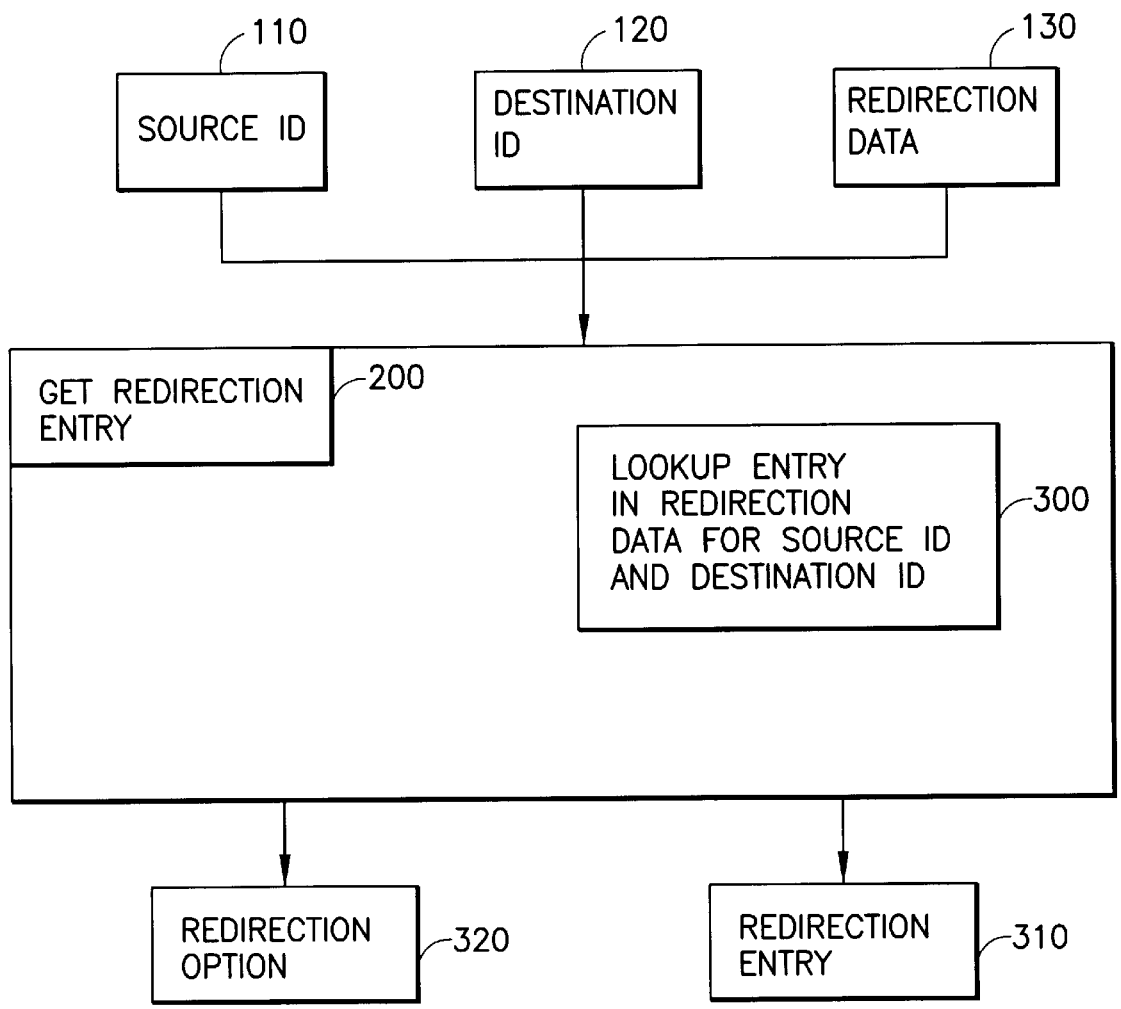
FIG. 3 illustrates a first step of the IPC redirection logic which gets the redirection entry and redirection options from the redirection data that corresponds to the source identifier and destination identifier.

FIG. 3 illustrates a first step of the IPC redirection logic which gets the redirection entry and redirection options from the redirection data that corresponds to the source identifier and destination identifier. As depicted, the source identifier (110) and destination identifier (120) are used to determine the redirection data entry (FIG. 4, 400) from the redirection data (130) (200). The redirection entry (310) and redirection option (320) in the redirection data entry (400) are obtained as a result (300).

Figure 4:
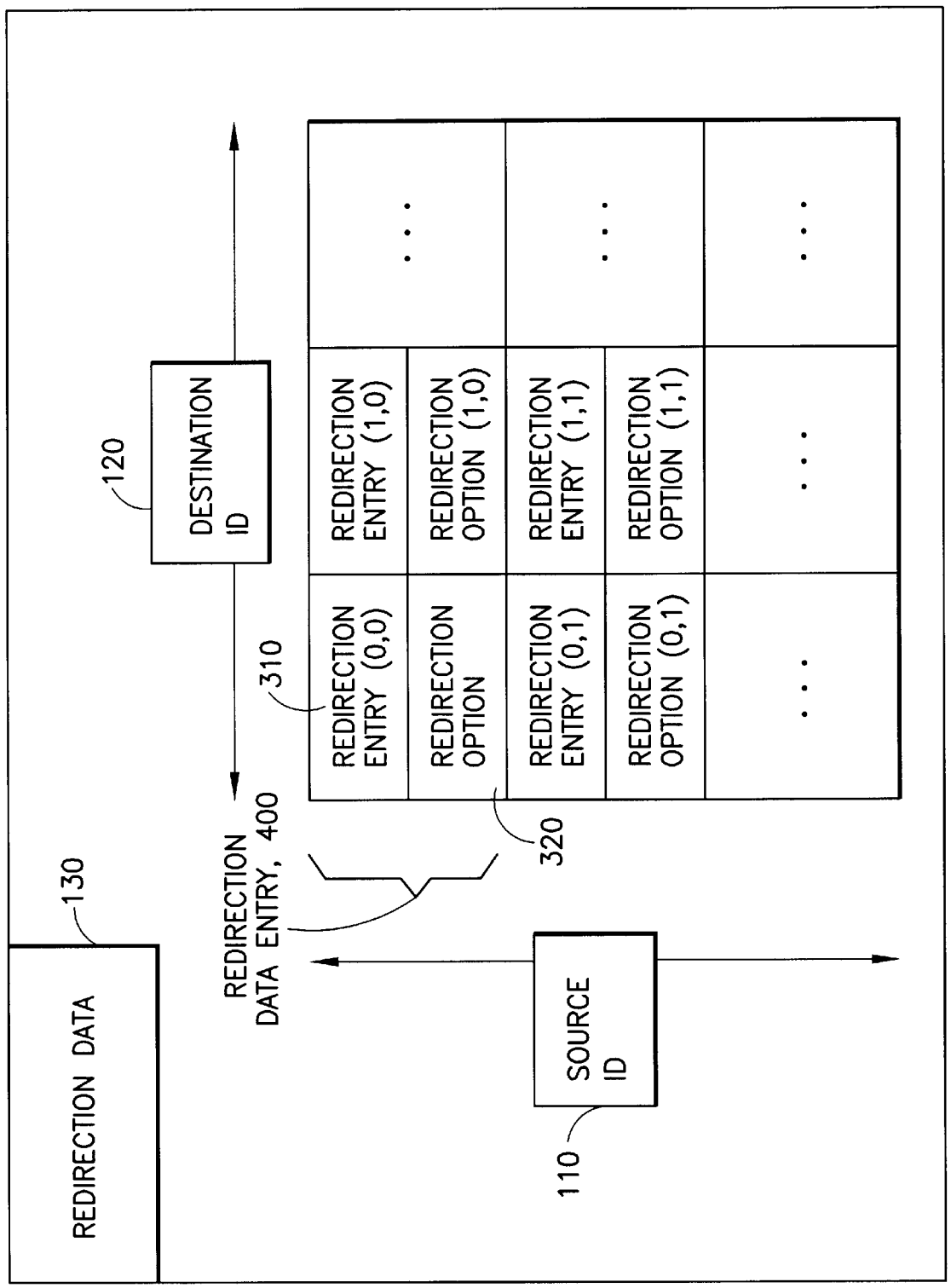
FIG. 4 illustrates the preferred embodiment of the redirection data as a table containing redirection data entries that consist of a redirection entry and redirection option.

FIG. 4 illustrates a preferred embodiment of the redirection data as a table containing redirection data entries that include a redirection entry and redirection option. As depicted, a table of redirection data entries (400) is arranged by source identifier (110) and destination identifier (120). Given a source identifier (110), destination identifier (120), and the size of the table, the redirection data entry (400) can be found directly. Each redirection data entry (400) includes a redirection entry (310) and a redirection option (320). The redirection entry (310) specifies either the new destination identifier for the IPC, or blocked, which indicates that the communication is not permitted. The redirection option (320) determines what information is to be sent to the redirection entry (310).

Those skilled in the art will appreciate that the redirection data can also be implemented as, among other things, a hash table; a hash table of limited hash chain length; a hash table of unlimited hash chain length; or a multidimensional array.

Figure 5:
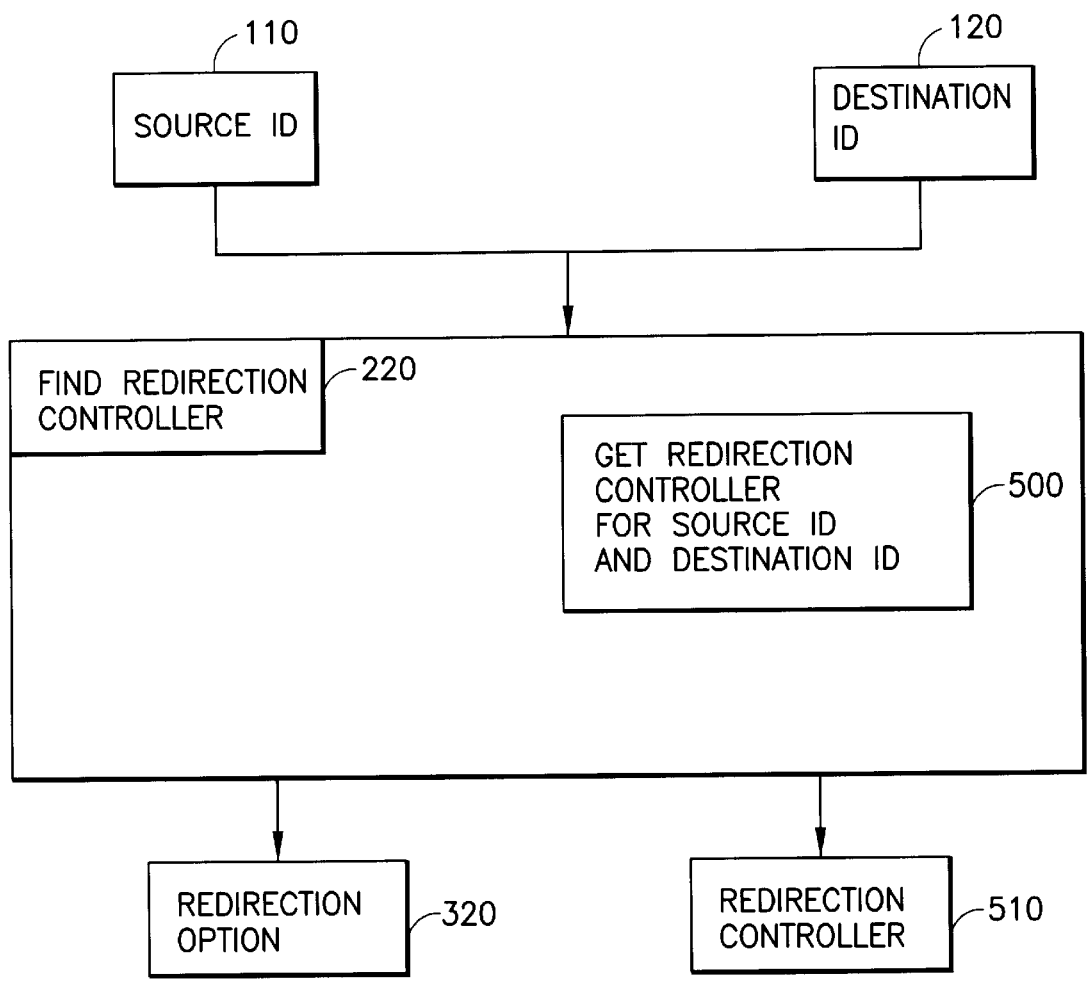
FIG. 5 illustrates an example of the step of the IPC redirection logic in which the redirection controller and redirection options for a particular pair of source and destination identifiers is retrieved.

FIG. 5 illustrates an example of the step of the IPC redirection logic in which the redirection controller and redirection options for a particular pair of source and destination identifiers is retrieved. As depicted, the source identifier (110) and the destination identifier (120) are used to determine the controller data entry (FIG. 6 (600) from the controller data (140) (220). The redirection controller's identifier (510) and the redirection option (320) are obtained as result (500).

Figure 6:
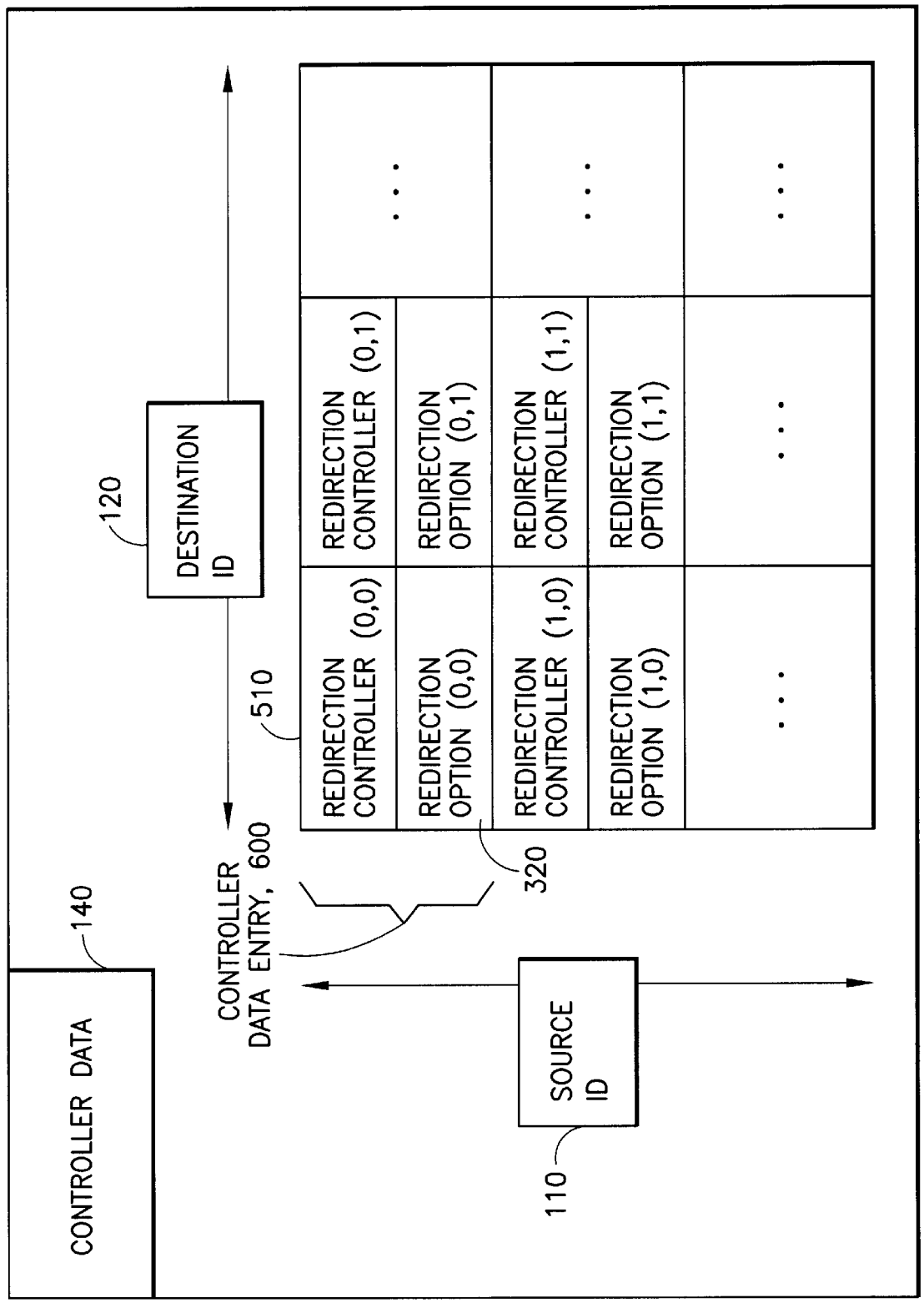
FIG. 6 illustrates an example of a preferred embodiment of the controller data as a table containing controller data entries that include a redirection controller and redirection option.

FIG. 6 illustrates an example of a preferred embodiment of the controller data as a table containing controller data entries that include a redirection controller and redirection option. As depicted, the controller data (140) is a table of controller data entries (600) arranged by source identifier (110) and destination identifier (120). Given a source identifier (110), destination identifier (120), and size of the table, the controller data entry (600) can be found directly. Each controller data entry (600) includes: a redirection controller (510), the identifier assigned to manage the IPC path from the source to the destination; and a redirection option (320), as described in FIG. 4 above.

Figure 7:
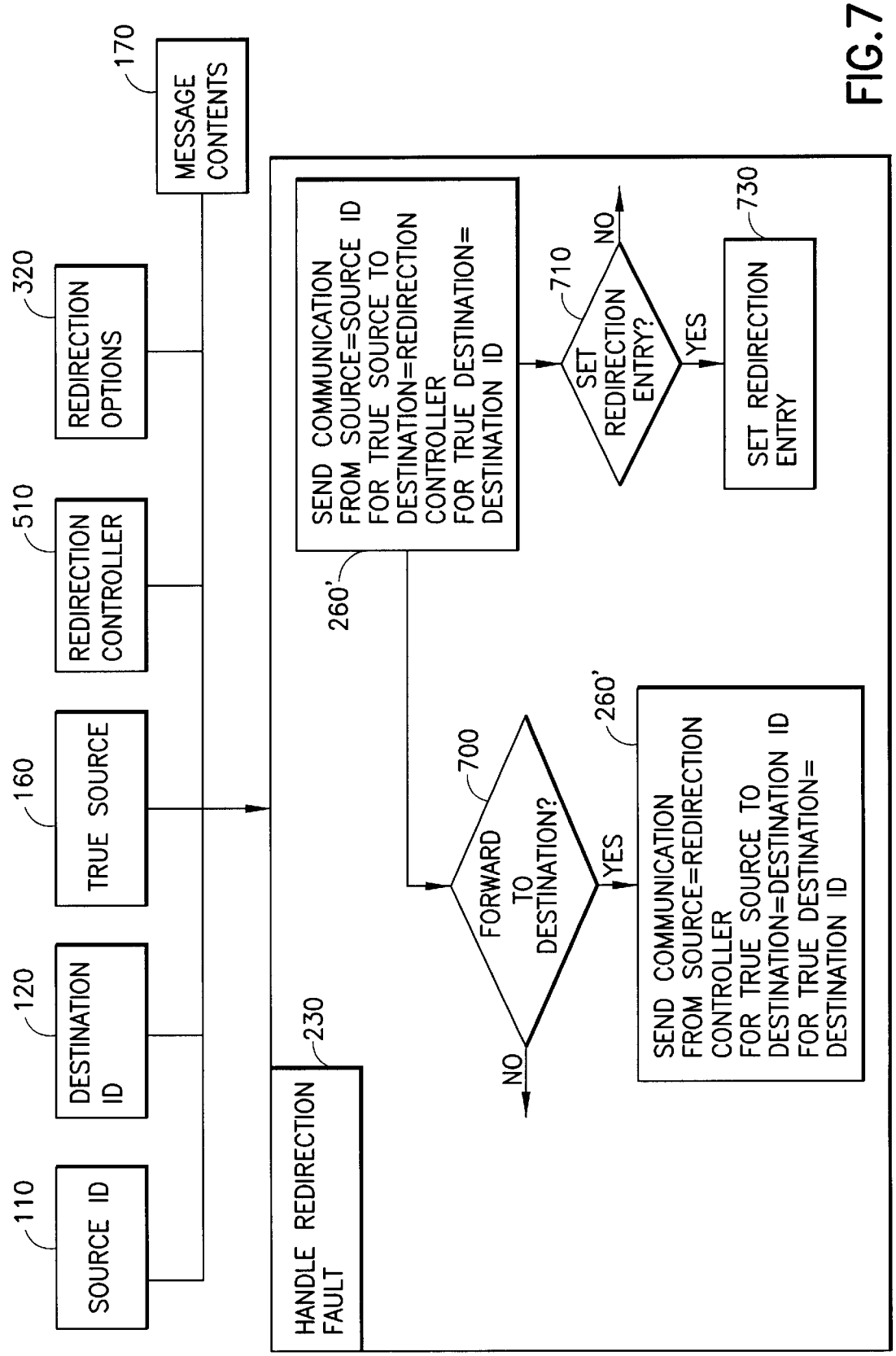
FIG. 7 illustrates an example of an asynchronous mechanism for handling a redirection fault in which the message is forwarded to the redirection controller who may set the redirection entry and/or forward the message to the destination.
Figure 8:
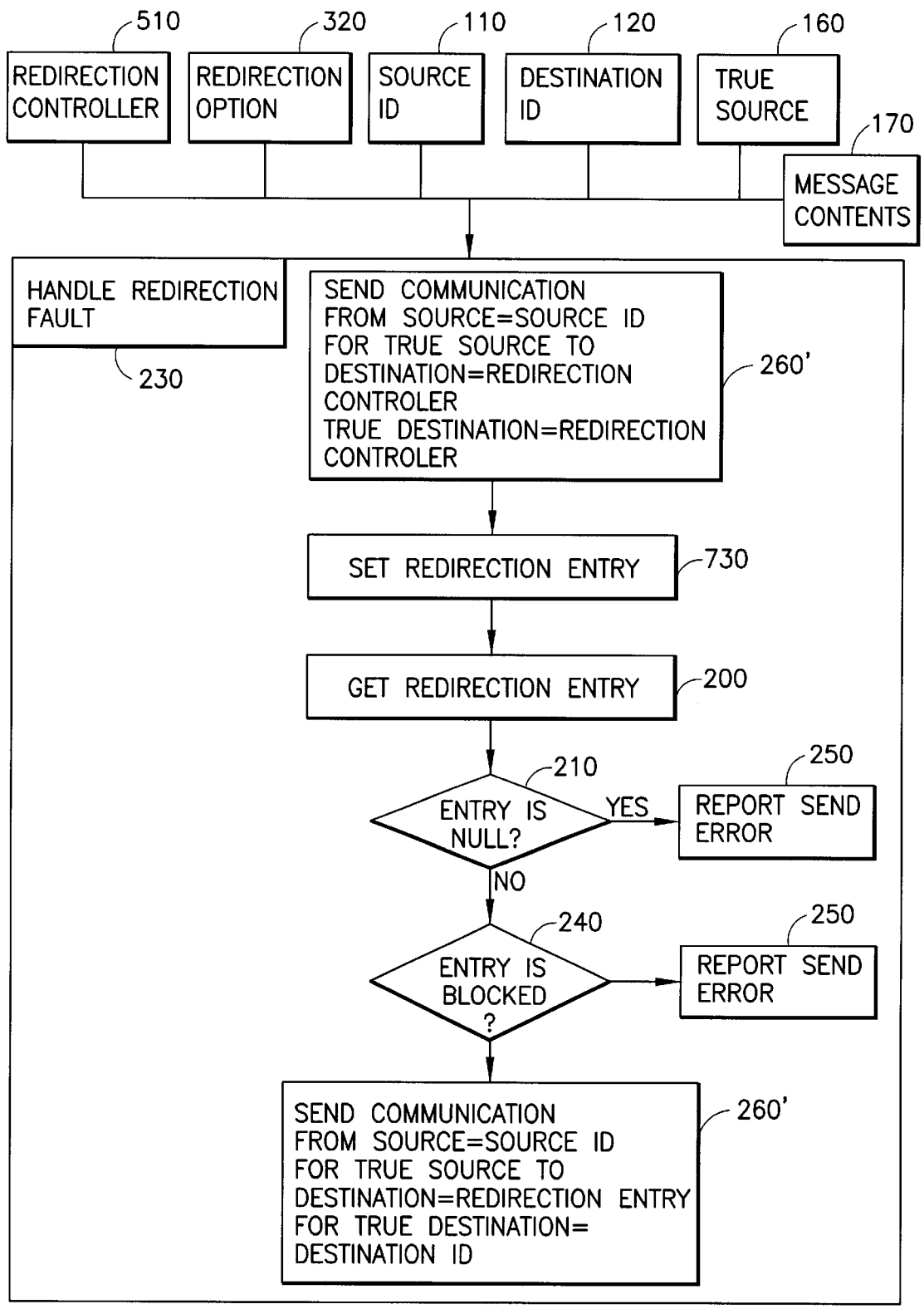
FIG. 8 illustrates an example of a synchronous mechanism for handling a redirection fault where the redirection controller is informed of the fault and sets one or more redirection entries before the message is forwarded to the destination specified in the redirection entries defined by the redirection controller.

FIGS. 7 and 8 depict examples of the redirection fault handling mechanism options (FIG. 2, 230).

FIG. 7 illustrates an example of an asynchronous mechanism for handling a redirection fault in which the message is forwarded to the redirection controller. The redirection controller may set the redirection entry and/or forward the message to the destination. As depicted, in step 260' an IPC is sent to the redirection controller (510) from the source indicated by the source identifier (110) with the current true source (160). The true destination (FIG. 9, 910) is set to the destination identifier (120). The message contents (170) are included optionally as determined by the redirection option (320). The redirection controller (510) performs two tasks (order is not important). In step 710, it determines whether or not to set the redirection data entry (400) for the combination of source identifier (110) and destination identifier (120). If a redirection data entry is to be set, then set redirection entry (step 730) is run. In step 700, the redirection controller determines whether to forward the IPC to the destination indicated by the destination identifier (120). If so, the redirection controller generates a IPC—on behalf of the true source (160)—to the destination identifier (120). If not, a send error is returned to the source identifier (250).

FIG. 8 illustrates an example of a synchronous mechanism for handling a redirection fault where the redirection controller is informed of the fault and sets one or more redirection entries before the message is forwarded to the destination specified in the redirection entries defined by the redirection controller. Here, the IPC is not sent until the redirection controller (510) sets the redirection data entry (400) for the source identifier (110) and the destination identifier (120). In step (260', an IPC is sent to the redirection controller (510) from the source identifier (110) on behalf of the true source (160). Here, the true destination (910) is the redirection controller (510). Again, the message contents (170) are included optionally as determined by the redirection option (320). The redirection controller (510) must recognize that this IPC indicates a redirection fault, so it can set the redirection data entry (400), in step 730. After the entry is set, the IPC process resumes by retrieving the newly-set redirection data entry (400), in step 200. If the redirection entry's (310) value is either 'null' (step 210) or 'blocked' (step (240), a send error is reported to the source identifier (110), in step (250. Otherwise, in step 260' an IPC is sent from the source identifier (110) on behalf of the true source (160) to the redirection entry (310) specified. The destination is the redirection entry (310) and the true destination (910) is the destination identifier (120).

Figure 9:
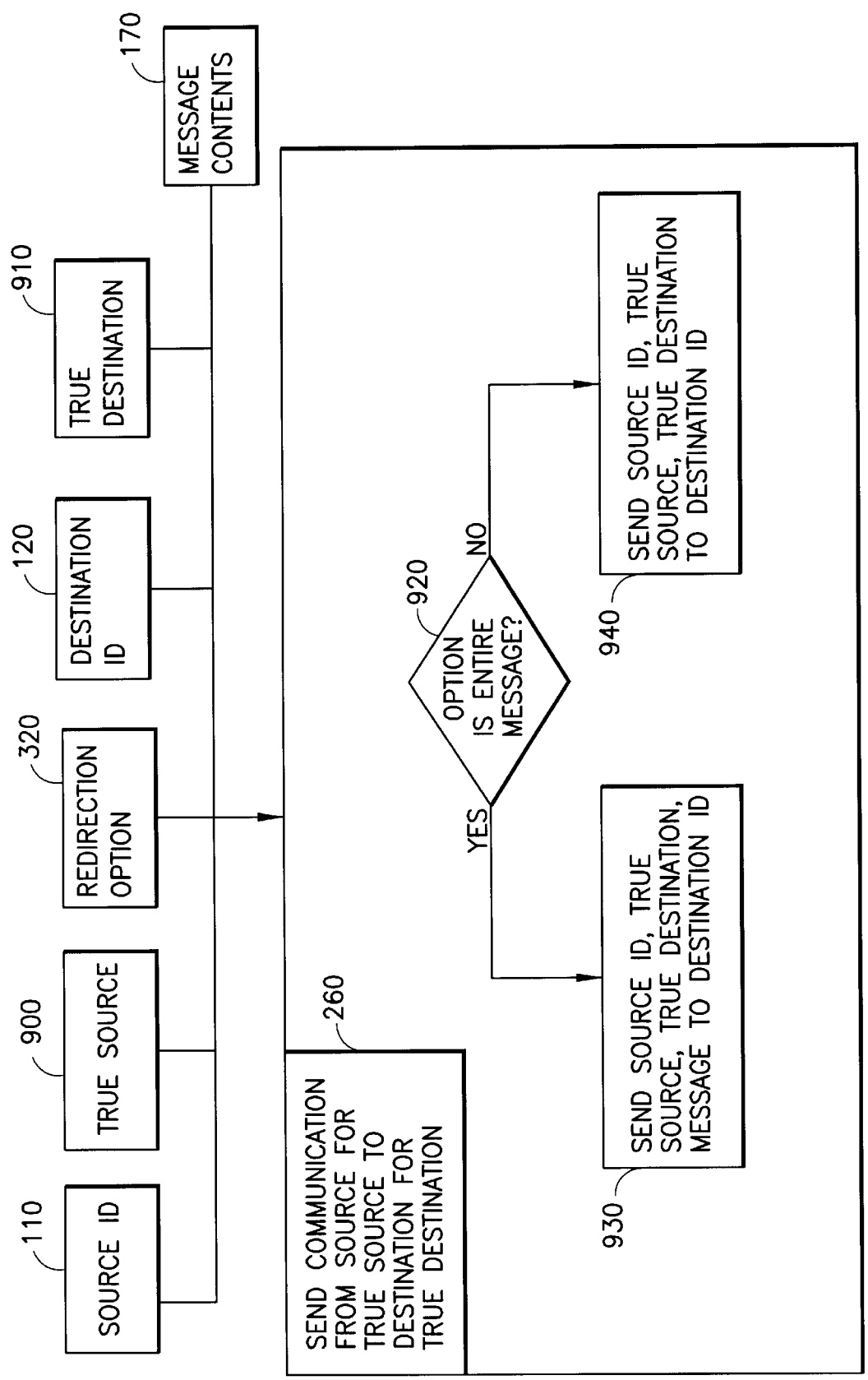
FIG. 9 illustrates an example of a step of the IPC redirection logic in which a message is communicated to a destination where the contents of the communication are determined by the redirection option.

FIG. 9 illustrates an example of a step of the IPC redirection logic in which a message is communicated to a destination where the contents of the communication are determined by the redirection option. As depicted, a IPC send mechanism (260) takes the source identifier (110), true source (160), destination identifier (120), true destination (910), redirection option (320), and message contents (170) as input. In step 920, the IPC send mechanism (260) examines the redirection option (320) to determine what to send to the destination. If the redirection option (320) specifies that the message contents (170) are to be sent, then in step 930 the communication includes the message contents (170). Otherwise, in step 940, only the identifiers (110, 120, 160, 910) are transmitted. The IPC send mechanism (260) states that the message is from the source identifier (110), on behalf of a true source (160), to the destination identifier (120), and intended for the true destination (910).

Figure 10:
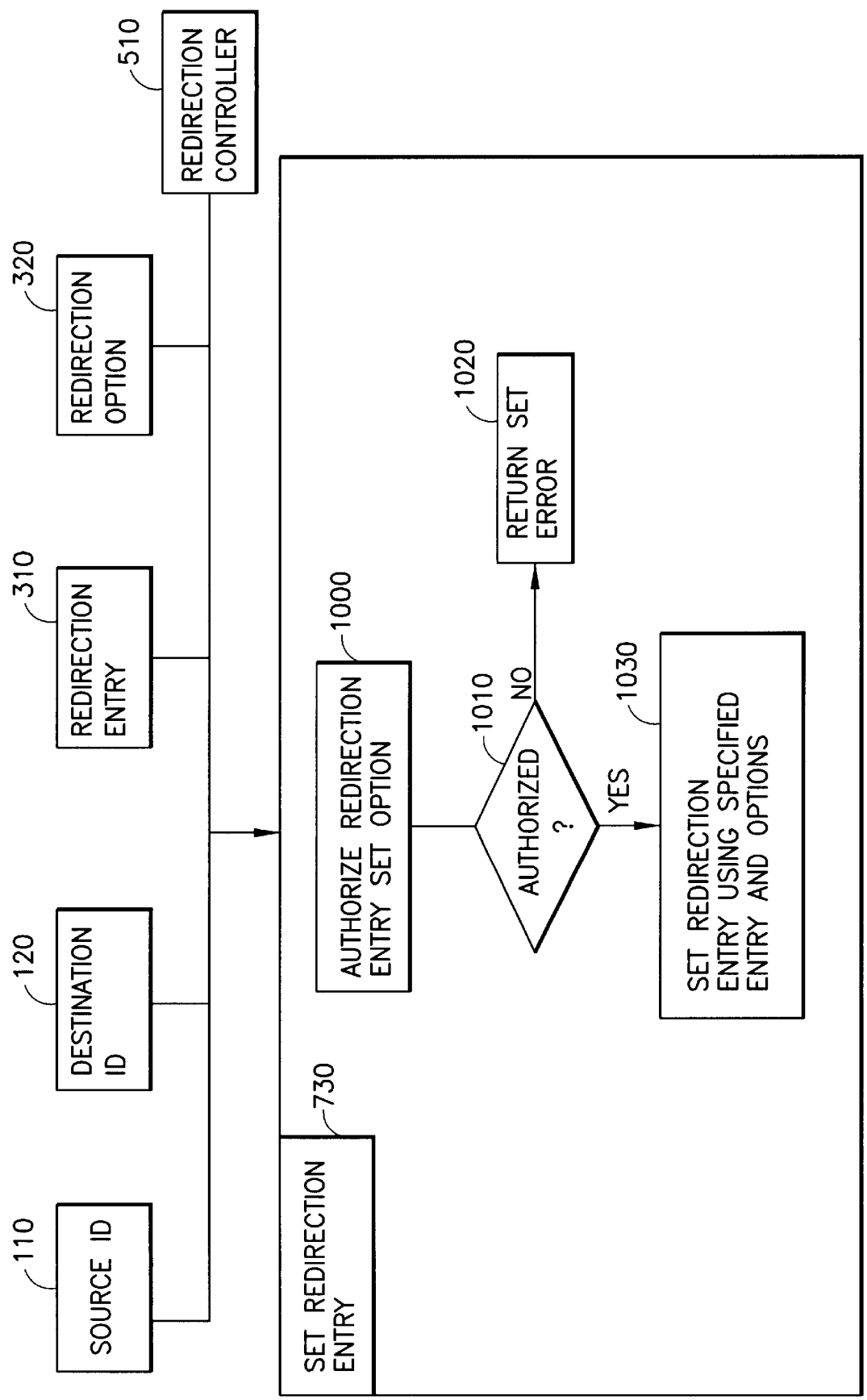
FIG. 10 illustrates an example of a step of redirection fault handling where the redirection controller sets a redirection entry for a particular pair of source and destination identifiers if authorized.

FIG. 10 illustrates an example of a step of redirection fault handling where the redirection controller can set a redirection entry for a particular pair of source and destination identifiers as specified by an authorized redirection controller (510). As depicted, in step 1000 the redirection controller (510) is authorized for the specified source identifier (110) and destination identifier 120). The authorization uses the controller data (140) to determine if the specified redirection controller (510) is the redirection controller of the IPC path from the source identifier (110) to the destination identifier (120). In a preferred embodiment, the IPC process (150) (i.e., the kernel) also creates active processes, and it associates the new process with the redirection controller (510) of the process that created it. Redirection controllers (510) can create new processes that are themselves redirection controllers (510). If the redirection controller (510) is authorized (1010), then the specified redirection entry (310) and redirection options (320) are specified for the IPC path between the source identifier (110) and the destination identifier (120) (1030). If not, a set error is returned to the redirection controller (510) (1020).

Example Applications

Interposition of Reference Monitors

A flexible access control infrastructure can be constructed using the IPC redirection mechanism (100). There are two dimensions of flexibility: complexity of reference monitors; and placement of reference monitors. A reference monitor is a trusted process that authorizes the controlled operations that processes invoke on one another. Traditional reference monitor systems use a single reference monitor that authorizes all controlled operations. Some IPC models, such as Clans & Chiefs (see J. Liedtke, *Clans & Chiefs*, in Achitektur von Rechensystemen, 1992, in English), enable a reference monitor to be assigned to particular IPC paths, but this assignment is static.

Figure 11:
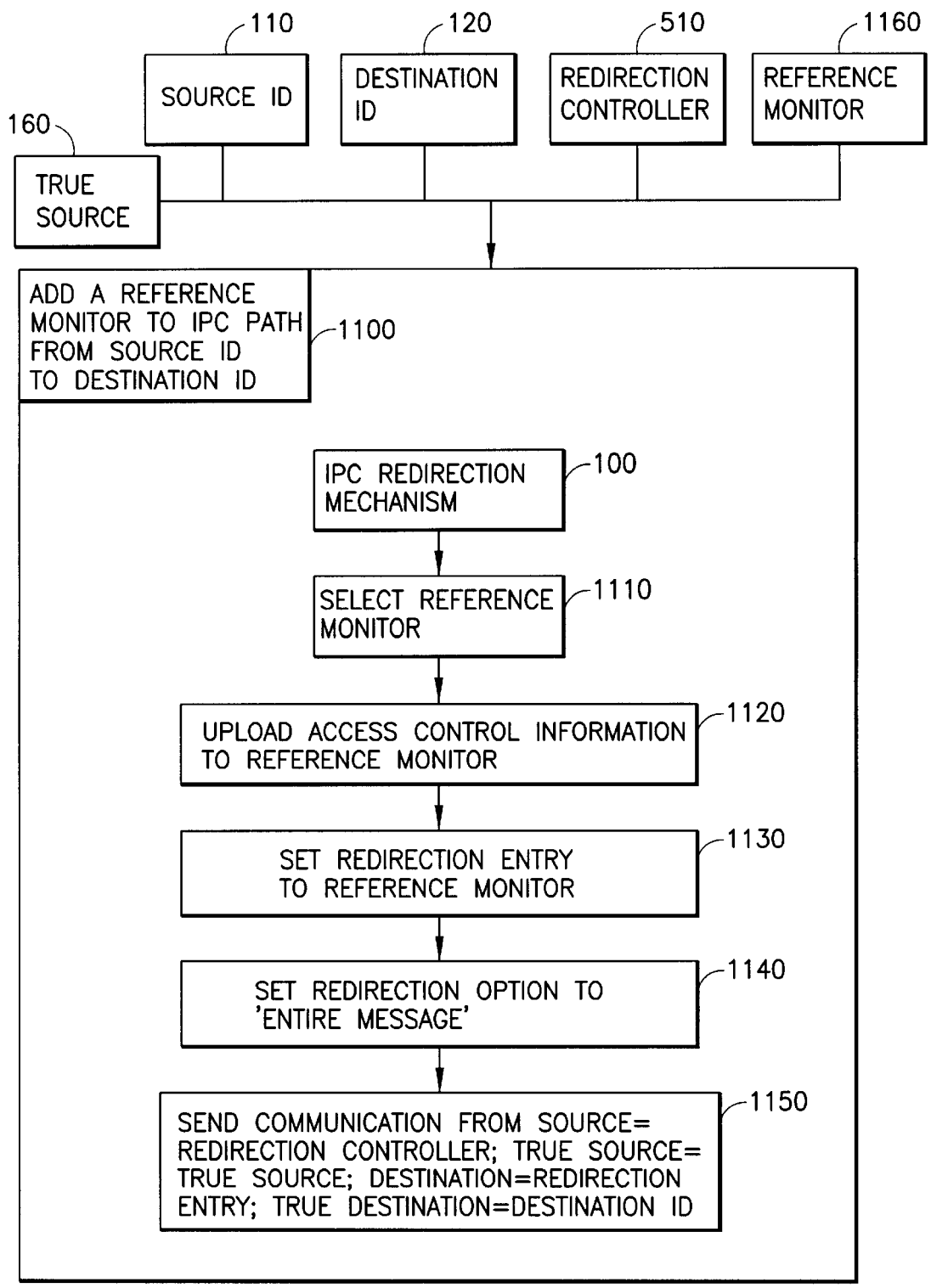
FIG. 11 depicts an example of how a reference monitor (1160) may be interposed on an IPC path using the IPC redirection mechanism.

FIG. 11 depicts an example of how a reference monitor (1160) may be interposed on an IPC path using the IPC redirection mechanism (100) (1100). Initially, the redirection data entry (400) for a particular pair of source and destination identifiers (110) (120) is null. When an IPC is sent from the source to the destination, the IPC redirection mechanism (100) takes a redirection fault and forwards the IPC to the redirection controller (using the asynchronous redirection fault handling). The redirection controller selects a reference monitor identifier (1160) for this IPC path (1110). Then, it populates the reference monitor (1160) process with the access control requirements for the source to call the destination (1120). The redirection controller then sets the redirection entry (310) for this IPC path to the reference monitor (1160) (1130) and sets the redirection option (320) to 'entire message' because the reference monitor will need to forward the message to the destination (1140). The message is then forwarded to the reference monitor (1150). Subsequent IPCs will be redirected to the reference monitor.

The IPC redirection mechanism (100) of the present invention includes features that enable the complexity of reference monitors to be changed dynamically. First, a reference monitor may be assigned as the redirection entry (310) on an IPC path for a pair of source and destination identifiers (110) (120). If the security requirements on the path change, a different reference monitor can be assigned by the redirection controller (510) for that IPC path (730). This enables monitoring to be maintained consistently with the complexity of the security requirements being enforced.

The IPC redirection mechanism (100) of the present invention also includes features that provide flexible control over the placement of reference monitors. Under some security conditions, it is possible to remove the reference monitors entirely from an IPC path. If the destination identifier's (120) process is trusted to authorize requests to access its objects from source identifier (110) processes, the source identifier process (110) is permitted to communicate with the destination (120), and the destination identifier (120) process does not need assistance preventing denial-of-service attacks from the source identifier (110) process, then the reference monitor on the IPC path between the source identifier (110) and destination identifier (120) may be removed. Removal is implemented by the redirection controller (510) setting the redirection entry (310) for the IPC path to the destination identifier (120) (730). Subsequent IPCs from the source identifier (110) will be sent directly to the destination identifier (120) (100). Further, if the security policy on this IPC path is changed, the redirection controller (510) can insert a reference monitor dynamically (730). Thus, the IPC redirection mechanism (100) gives system designers flexible control in the management of the performance versus security tradeoff.

Interposition of Debuggers

Another application of the IPC redirection mechanism (100) of the present invention is the dynamic interposition of debuggers. Typically, a kernel-level debugger enables examination of memory usage and IPC requests sent by a particular process. Kernel debugging also provides complete access to physical memory, so it may not be appropriate in some production environments to provide such debugging support via the kernel. Instead, a "kernel" debugger can be interposed that can trace access to kernel operations and page fault handling (which in the preferred embodiment is actually handled at user-level).

Figure 12:
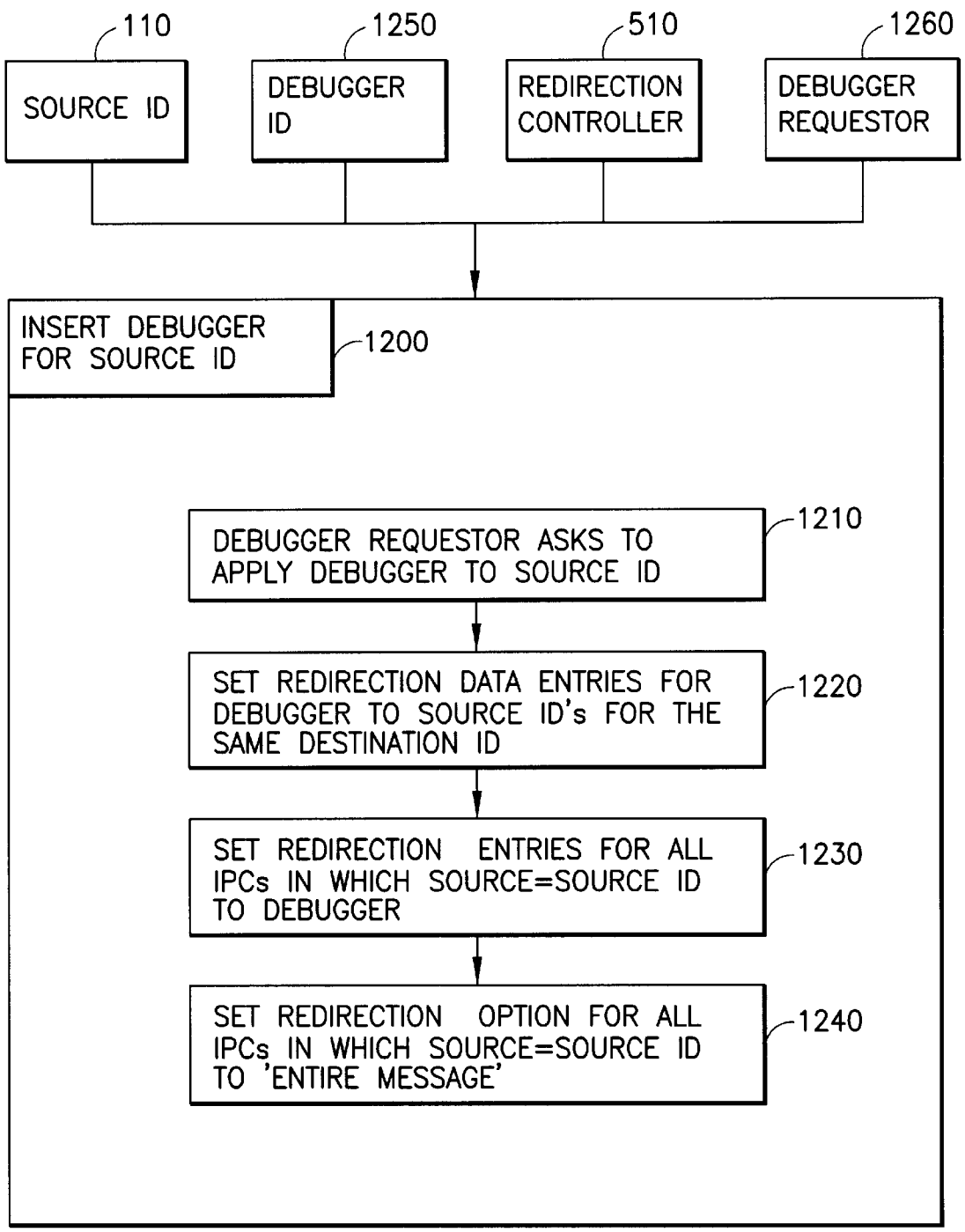
FIG. 12 depicts an example of how a debugger process (1250) can be added to an IPC path dynamically (1200).

FIG. 12 depicts an example of how a debugger process (1250) can be added to an IPC path dynamically (1200). Initially, the suppose that the redirection entry (310) for an IPC path between a pair of source and destination identifiers (110) (120) is set to the destination identifier (120). First, a debugger process requester (1260) asks the redirection controller (510) that a debugger (1250) be added for the source identifier's (110) process (1210). The redirection controller (510) sets all the redirection data entries (400) for the debugger to be those of the source (110), so the prior behavior is preserved (1220). Then, the redirection entries (310) for the IPCs from the source identifier's process (110) are set to the debugger identifier (1250) (1230). The redirection option (320) for the IPC path is set to 'entire message' (1240). All subsequent IPCs from the source identifier's (110) process will be redirected to the debugger identifier's (1250) process.

Having described preferred embodiments of the present invention, alternatives, modifications and variations will become apparent to those skilled in the art. It is therefore to be understood that changes may be made in the particular embodiments of the invention disclosed that are within the scope and spirit of the invention as outlined by the appended claims.

What is claimed is:

1. A method for performing interprocess communication (IPC) redirection in a system having stored redirection data for specifying a redirection destination for each of a plurality of source and destination pairs, comprising the steps of:

an IPC process receiving an IPC request, the IPC request including a source identifier and a destination identifier pair;

retrieving redirection data stored for said source identifier and destination identifier pair, said redirection data comprising a mapping of the interprocess communication path for said source and destination pair to an entry specifying an actual destination for the IPC process to use for the pair;

redirecting said IPC when said redirection data indicates an actual redirection destination by modifying a redirection entry specifying an actual destination for the IPC associated with the source identifier and the destination identifier; and retrieving a redirection controller assigned to said IPC process to redirect said IPC when said redirection data does not indicate an actual destination;

wherein the IPC process can restrict a set of redirection entries that can be modified.

2. The method as claimed in claim 1, further comprising the step of assigning one redirection controller to all source and destination identifier combinations with a particular source identifier.

3. The method as claimed in claim 1, further comprising the step of assigning one redirection controller to all source and destination identifier combinations of a set of sources.

4. The method as claimed in claim 1, further comprising the step of assigning one redirection controller to source and destination identifier combinations with a particular destination identifier.

5. The method as claimed in claim 1, further comprising the step of assigning one redirection controller is assigned to all source and destination identifier combinations of a set of destinations.

6. The method as claimed in claim 1, further comprising the step of assigning one redirection controller to all source and destination identifier combinations.

7. The method as claimed in claim 1, further comprising the step of a redirection controller setting the value of a redirection entry to the destination identifier.

8. The method as claimed in claim 1, further comprising the step of a redirection controller setting a value of a redirection entry to another process.

9. The method as claimed in claim 1, further comprising the step of a redirection controller setting a value of a redirection entry to null.

10. The method as claimed in claim 1, further comprising the step of a redirection controller setting a value of a redirection entry to 'blocked,' thus rejecting any IPC having this source and destination identifier combination.

11. The method of claim 1, further comprising the step of specifying redirection entries for this and other IPC paths.

12. The method of claim 1, further comprising the step of:
the IPC process searching for an entry in its redirection data for the source and destination identifier combination if there is no redirection entry for the source and destination identifier combination, taking a redirection fault and determining a redirection controller associated with the source and destination identifier combination.

13. The method of claim 1, further comprising the step of:
specifying redirection entries for a current source and destination identifier combination and one or more other IPC source and destination identifier combinations.

14. The method as claimed in claim 1, wherein the redirection entry for a source and destination identifier combination is a destination identifier and a set of one or more redirection options.

15. The method as claimed in claim 14, wherein the destination identifier for the redirection entry is a process identifier.

16. The method as claimed in claim 14, wherein the destination identifier for the redirection entry indicates that an IPC path associated with a source and destination identifier combination is blocked.

17. The method as claimed in claim 14, wherein the destination identifier for a redirection entry is null.

18. The method as claimed in claim 14, wherein the destination identifier for a redirection entry is a message queue.

19. The method as claimed in claim 15, wherein the destination identifier for the redirection entry is the identifier for the destination process.

20. The method as claimed in claim 15, wherein the destination identifier for the redirection entry is an identifier for a process other than the destination process.

21. The method of claim 1, wherein the redirection data is implemented as a data structure selected from the group consisting of: a hash table; a multidimensional array; a hash table of limited hash chain length; or a hash table of unlimited hash chain length.

22. The method as claimed in claim 14, wherein a redirection option specifies whether the communication contents should be sent to the redirection controller.

23. The method as claimed in claim 14, wherein a redirection option is to send the source and destination identifiers, a true source of the communication, and a message body.

24. The method as claimed in claim 14, wherein a redirection option is to send the source and destination identifiers, and a true source of the communication.

25. The method as claimed in claim 14, wherein a redirection option specifies whether the communication should be blocked until the redirection controller sets the redirection entry destination identifier.

26. The method as claimed in claim 14, wherein the options of a redirection entry specify whether the communication is automatically forwarded to the redirection controller.

27. A method as claimed in claim 1, further comprising the step of the IPC process blocking the communication until the redirection controller has set the redirection entry on a redirection fault.

28. A method as claimed in claim 1, wherein the IPC process completes the communication by forwarding it to the redirection controller on a redirection fault.

29. A method as claimed in claim 1, wherein the IPC process is a redirection controller.

30. A method as claimed in claim 1, wherein a process other than the IPC process is a redirection controller.

31. A method as claimed in claim 1, further comprising the step of interposing a reference monitor on an IPC path.

32. A method as claimed in claim 1, further comprising the step of dynamically adding a debugger process to an IPC path.

33. A program storage device readable by a machine, tangibly embodying a program of instructions executable by said machine to perform method steps for performing interprocess communication (IPC) redirection in a system having stored redirection data for specifying a redirection destination for each of a plurality of source and destination pairs, comprising the steps of:
receiving an IPC request from an IPC process, the IPC request including a source identifier and a destination identifier;
retrieving redirection data stored for said source identifier and destination identifier pair, said redirection data comprising a mapping of the interprocess communication path for said source and destination pair to an entry specifying an actual destination for the IPC process to use for the pair;
redirecting said IPC when said redirection data indicates an actual redirection destination by modifying a redirection entry specifying an actual destination for the IPC associated with the source identifier and the destination identifier; and
retrieving a redirection controller assigned to said IPC process to redirect said IPC when said redirection data does not indicate an actual destination;
wherein the IPC process can restrict a set of redirection entries that can be modified.

34. A system for performing interprocess communication (IPC), the system comprising:
   a. an IPC path comprising one source identifier representing one or more senders of a communication and one destination identifier that represents one or more receivers of the communication;
   b. IPC process means for transferring a communication from a source identifier to a destination identifier,
   c. redirection data means stored by the IPC process that specifies the actual destination for IPCs between each pair of source and destination identifiers;
   d. one or more redirection controllers assigned to one or more particular IPC paths for specifying the redirection data, the redirection controller may specify redirection entries for this and other IPC paths, if permitted; and
   e. the IPC process means including means for finding an entry in its redirection data for the combination of source and destination to determine whether to redirect the communication and where to redirect the communication; and if there is no redirection entry for a particular combination of source and destination, the IPC process means includes means for taking a redirection fault and determining the redirection controller assigned to that IPC path.

* * * * *